(12) United States Patent
Chen

(10) Patent No.: US 6,282,110 B1
(45) Date of Patent: Aug. 28, 2001

(54) SWITCHED MODE POWER SUPPLY

(75) Inventor: Chun-Hsiung Chen, Taoyuan (TW)

(73) Assignee: Asian Power Devices, Inc., Taoyaun (TW)

( * ) Notice: Subject to any disclaimer, the term of this patent is extended or adjusted under 35 U.S.C. 154(b) by 0 days.

(21) Appl. No.: 09/675,560

(22) Filed: Sep. 29, 2000

(51) Int. Cl.[7] .................................................. H02M 3/335
(52) U.S. Cl. ........................................... 363/95; 363/21.12
(58) Field of Search ................................ 363/95, 97, 131, 363/20, 21.01, 21.12

(56) References Cited

U.S. PATENT DOCUMENTS

| | | | |
|---|---|---|---|
| 5,412,556 | * 5/1995 | Marinus | 363/21 |
| 5,671,131 | * 9/1997 | Brown | 363/56 |
| 6,134,123 | * 10/2000 | Yamada | 363/21 |

* cited by examiner

*Primary Examiner*—Adolf Deneke Berhane
(74) *Attorney, Agent, or Firm*—Kolisch Hartwell Dickinson McCormack & Heuser

(57) ABSTRACT

A switched power supply, which can effectively detect and monitor the power supply to electrical appliances and terminate the power supply if any abnormal overpower phenomenon occurs, is disclosed. The switched power supply includes a detecting and processing unit connected between an output end of the switched power supply and a wave width modulator of the power supply for detecting an output power of the switched power supply. The detecting and processing unit includes an overpower detecting circuit for determining whether the output power of the switched power supply exceeds a set value, and a timing circuit for determining whether the duration of overpower phenomenon exceeds a set time period and switching off the wave width modulator if the set time is exceeded.

4 Claims, 2 Drawing Sheets

SWITCHED MODE POWER SUPPLY

FIELD OF THE INVENTION

The present invention relates to a switched mode power supply, and more particularly to a switched mode power supply that can effectively detect and monitor the power supply to electrical appliances and terminate the power supply if any abnormal overpower phenomenon occurs.

DESCRIPTION OF RELATED ART

It is known that the peripheral equipment of a computer, such as a printer or a scanner, generally utilizes a DC motor as a driving unit. For such a DC motor, a large peak current may be required upon activating the motor. The peak current generally is 1.5–5 times a normal operation current. To meet the requirement of the peak current, a power supply to the peripheral equipment needs to be designed with a tolerance of maximum peak current. Obviously, such design may cause a high cost and increased volume of the power supply. Another significant disadvantage is that the existing power supply may become dangerous to the user if there is any abnormal output power occurring due to the large peak current.

To solve this problem, it is necessary to provide an improved power supply which can monitor the transient output power and prevent any danger caused by any abnormal power.

SUMMARY OF THE INVENTION

In accordance with one aspect of the present invention, a switched mode power supply having a main transformer, a power circuit, a power transistor, a wave width modulator, and an output transfer circuit, comprises a detecting and processing unit connected between an output end of the switched mode power supply and the wave width modulator for detecting an output power of the switched mode power supply. The detecting and processing unit includes an overpower detecting circuit for determining whether the output power of the switched mode power supply exceeds a set value, and a timing circuit for determining whether the duration of overpower phenomenon exceeds a set time period and switching off the wave width modulator if the set time period is indeed exceeded.

In accordance with another aspect of the present invention, the detecting and processing unit is connected to an output end of the switched mode power supply via an isolated circuit.

In accordance with a further aspect of the present invention, the detecting and processing unit is composed of an integrated circuit with a function of processing.

DETAILED DESCRIPTION OF THE PREFERRED EMBODIMENT

Figure 1:
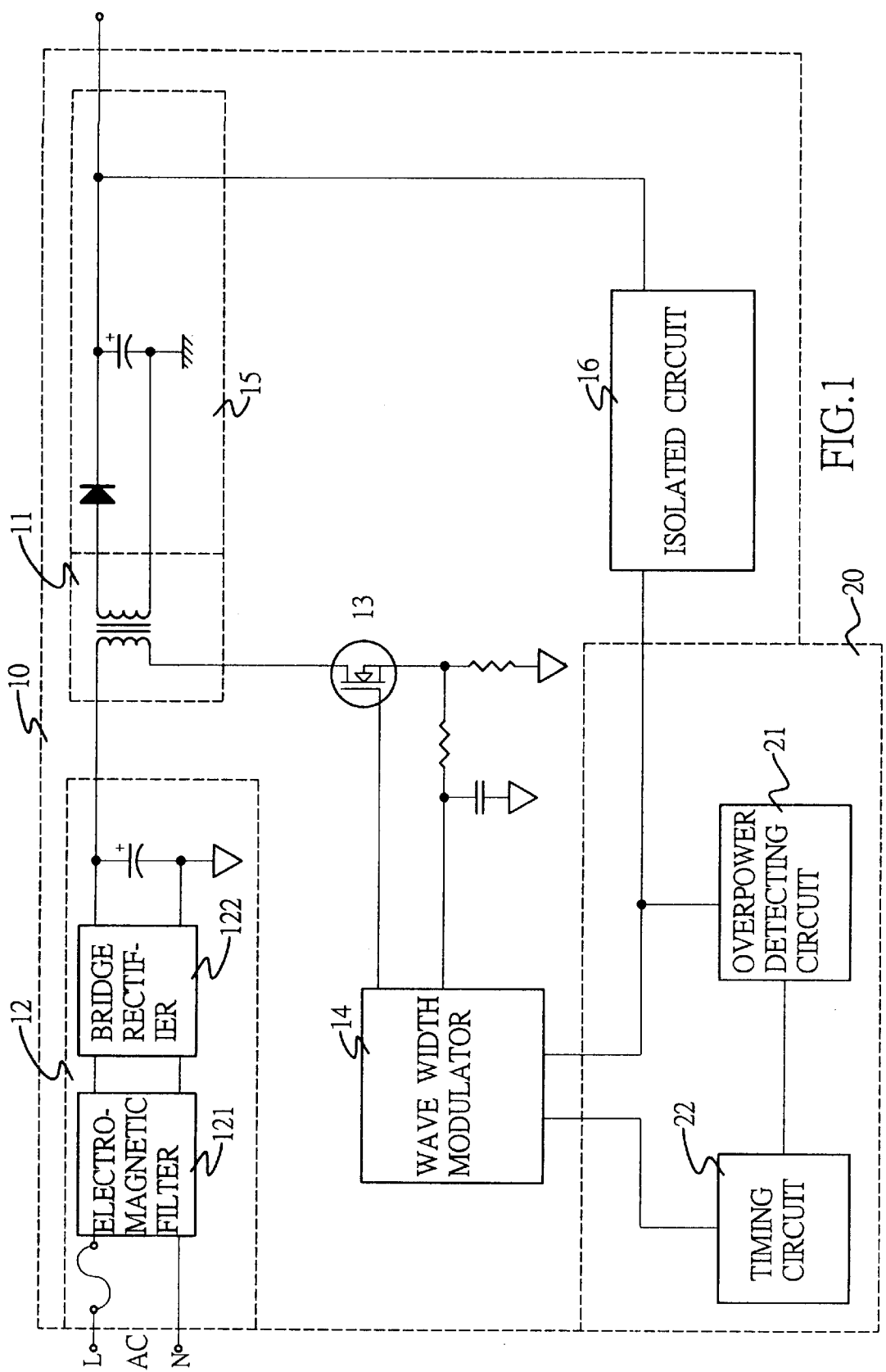
FIG. 1 is a block view showing a circuit arrangement of the present invention.

With reference to FIG. 1, a switched mode power supply (10) in accordance with the present invention has a basic structure similar to the known power supply, which includes a main transformer (11), a power circuit (12), a power transistor (13), a wave width modulator (14), an output transfer circuit (15) and an isolated circuit (16). The power circuit (12) is arranged at a first side of the main transformer (11) in order to supply power to the transformer (11). The power circuit (12) is composed of an electromagnetic filter (121) and a bridge rectifier (122). The power transistor (13) is connected with the first side of the transformer (11) to control a current flow through the first side of the main transformer (11). The wave width modulator (14) is connected with the power transistor (13) for generating a square-wave signal and driving the power transistor (13). The width of the square-wave is adjustable. The output transfer circuit (15) is connected with a second site of the main transformer (11) to transfer the DC current output by the main transformer (11). The isolated circuit (16) is connected between an output end of the output transfer circuit (15) and the wave width modulator (14). Since the above structure is substantially the same as that of a conventional power supply, a detailed description on the circuit layout and the principle of operation will be omitted.

A significant improvement of the present invention is that the switched mode power supply (10) further includes a detecting and processing unit (20). The detecting and processing unit (20) is provided for capturing a current signal that is fed back to the wave width modulator (14) through the isolated circuit (16). Depending on the feedback current signal, the detecting and processing unit (20) can determine whether an overpower effect happens. If the overpower effect continues for a certain period of time, the wave width modulator (14) will be switched off to terminate the power supply.

The detecting and processing unit (20) generally comprises an overpower detecting circuit (21) and a timing circuit (22). The overpower detecting circuit (21) is composed of a comparator circuit (not numbered). An input end of the comparator circuit is connected to the output end of the output transfer circuit (15) via the isolated circuit (16) in order to receive an output signal of the output transfer circuit (15). The reference voltage of the comparator circuit is a pre-determined transient power peak. Therefore, the comparator circuit can determine whether the output power is bigger than the transient power peak. If the output power is determined to be more than the transient power peak, the timing circuit (22) will be activated to begin timing.

In operation of a printer or a scanner, a peak current of a DC motor is typically 1.5–5 times a normal operating current, therefore the reference voltage of the comparator is set on the basis of the peak current. Also, the operation of the DC motor with peak current generally lasts for 0.4–1.0 seconds. In such case, the timing period of the timing circuit (22) will be set over 1 second. If the DC motor keeps operating with the peak current after the timing circuit (22) terminates timing, an abnormal power supply situation will be displayed. Then the timing circuit (22) will output a signal so that the wave width modulator (14) will be switched off and the power supply will be stopped, thereby ensuring a safe power supply.

Figure 2:
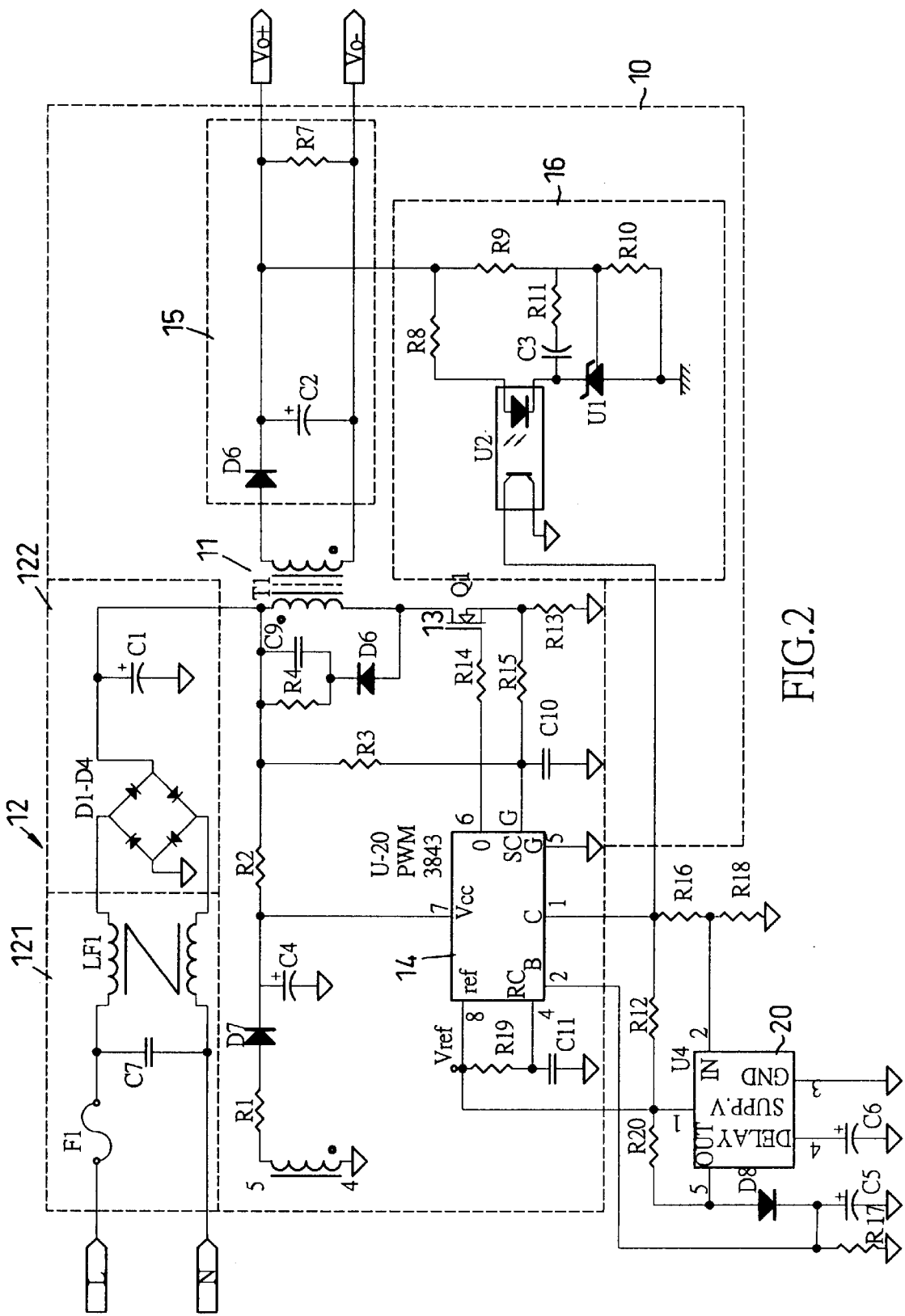
FIG. 2 is a circuit diagram showing a detailed circuit layout of the present invention.

Now the detailed circuit of the switched power supply (10) will be illustrated with reference to FIG. 2.

As the description mentioned above, the switched power supply (10) includes the main transformer (11), the power circuit (12), the power transistor (13), the wave width modulator (14), the output transfer circuit (15) and the isolated circuit (16). The isolated circuit (16) typically includes an optical coupler (U2). An input end of the optical coupler (U2) is connected with an output end of the output transfer circuit (15) via a first resistor (R8) and is grounded via a first capacitor (C3), a second resistor (R11) and a diode (U1). An output end of the optical coupler (U2) is connected with a feedback signal pin (C) of the wave width modulator (14) and an output end of the detecting and processing unit (20).

In a preferred embodiment, the detecting and processing unit (20) is composed of an IC (Integrated Circuit) processor numbered "51957". Therefore, the overpower detecting circuit (21) and the timing circuit (22) are integrated in the IC processor.

Further, an input pin (IN) of the IC processor is connected with an output end of the isolated circuit (16) via a third resistor (R18) and a fourth resister (R16) in order to capture the output voltage of the switched mode power supply (10).

A delay and timing function pin (DELAY) of the IC processor is connected with a second capacitor (C6) that is provided for determining a timing length of the detecting and processing unit (20).

An output pin (OUT) of the IC processor is connected to a control pin (B) of the wave width modulator (14) via a second diode (D8).

The higher the output current of the switched power supply (10) gets, the higher the output voltage of the isolated circuit (16) will be. When the detecting and processing unit (20) detects the output voltage of the isolated circuit (16) exceeding a set value, the timing function of the timing circuit (22) will be activated. If the exceeding output voltage returns to a normal value during the timing period, it means the exceeding output voltage is a phenomenon of a transient power peak upon activating a load. In such case, the detecting and processing unit (20) will automatically reset to ZERO and move to standby for detecting. If the output voltage keeps exceeding the set value after the end of the timing period, it means an abnormal power supply has occurred. In such case, the detecting and processing unit (20) will output a signal to the wave width modulator in order to terminate the power supply.

From the above description, it is understood that the switched mode power supply (10) in accordance with the present invention not only can supply power to the DC motors in peripheral equipment of the computer, but also effectively detect and monitor the power supply so as to terminate the power supply if any abnormal phenomenon occurs.

What is claimed is:

1. A switched mode power supply having a main transformer, a power circuit, a power transistor, a wave width modulator, and an output transfer circuit, comprising:

a detecting and processing unit control unit connected between an output end of the switched mode power supply and the wave width modulator for detecting an output power of the switched mode power supply, wherein said detecting and processing unit includes:
an overpower-detecting circuit for determining whether the output power of the switched power supply exceeds a set value; and
a timing circuit for determining whether the duration of an overpower phenomenon exceeds a set time period, and switching off the wave width modulator if the duration of the overpower phenomenon does not exceed the set time period.

2. The switched mode power supply as claimed in claim 1, wherein said detecting and processing unit is connected to an output end of the switched mode power supply via an isolated circuit.

3. The switched mode power supply as claimed in claim 1, wherein said detecting and processing unit is composed of an integrated circuit with a function of processing.

4. The switched mode power supply as claimed in claim 2, wherein said detecting and processing unit is composed of an integrated circuit with a function of processing.

* * * * *